April 7, 1964    D. L. BROWN ETAL    3,128,466
RADOME BORESIGHT ERROR COMPENSATOR
Filed Sept. 4, 1953
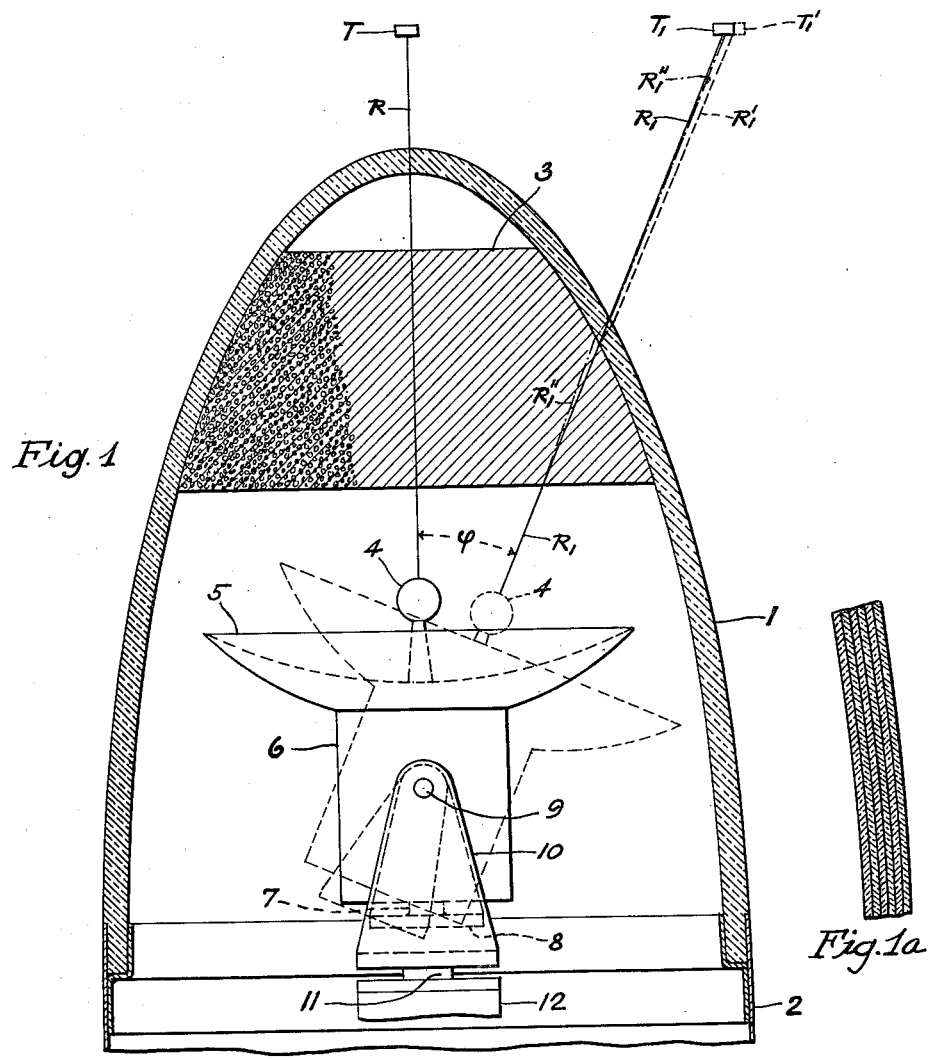
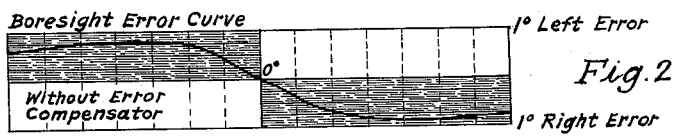
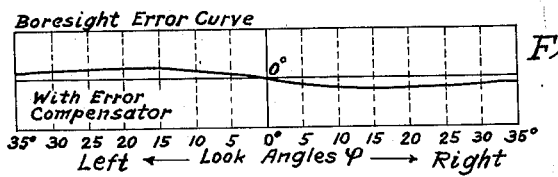
INVENTORS
Donald L. Brown &
Alden L. Rogers
BY
ATTORNEY

United States Patent Office 3,128,466
Patented Apr. 7, 1964

3,128,466
RADOME BORESIGHT ERROR COMPENSATOR
Donald L. Brown, Akron, and Alden L. Rogers, Cuyahoga Falls, Ohio, assignors to Goodyear Aerospace Corporation, a corporation of Delaware
Filed Sept. 4, 1953, Ser. No. 378,514
7 Claims. (Cl. 343—705)

This invention relates to the construction of radar antenna radomes in the shape of a body of rotation and in particular to means for compensating the boresight error of such radomes for guided missiles. The term "boresight error" is to be understood as the angular deviation of the position of a target as seen by the antenna through the radome from the actual target position as seen through the bore of a gun.

Since electro-magnetic rays emitted from a radar antenna, following optical laws, pass through a radome wall at all points in a straight line only when striking it perpendicularly, for instance, with the antenna swingable about the center of a spherical radome. However, radomes for guided missiles must be streamlined for least air resistance and, therefore, only the antenna rays passing through the center of such a radome will be unbroken and find the target in a straight line, whereas all other rays striking the radome wall at an incident angle will be refracted and the antenna will see a target in an angular off-position due to a smaller or larger boresight error which must be compensated to make the antenna operate properly. Radomes for guided missiles, preferably of elliptical shape, require a high degree of workmanship and dimensional accuracy of the contours and wall thickness to obtain good results. It has been found that as the incident angle of the radar antenna beam with the radome wall increases the total boresight error increases. This indicated the radome wall thickness theoretically increased and that refraction of the electromagnetic energy was causing the major portion of the boresight error. Attempts have been made to correct the wall thickness of the radome by cutting it down at certain portions to improve the boresight error curve which can be readily determined by a special recording detector, however, it is very difficult to achieve satisfactory results by such method.

It is the general object of the invention to avoid and overcome the foregoing and other difficulties of and objections to prior art practices by making the wall thickness of a radar antenna radome not uniform in the direction perpendicular to the wall but rather uniform in the directions of the antenna look angles, that is, the actual wall thickness would decrease as the incident beam angle increases.

Another object of the invention is to deflect the direction of a radar antenna beam before it reaches the radome wall to compensate the refraction of the beam by the radome wall.

Another object of the invention is to provide a relatively simple and practical means for compensating the boresight error of a radar antenna radome.

The aforesaid objects of the invention and other objects which will become apparent as the description proceeds are achieved by providing a radar antenna radome made of resin-impregnated glass fiber cloth and having a dielectric constant of about 4.0 with a closely porous plug of suitable thickness having a much lower dielectric constant of about 1.03 inserted in proper position in the radome and cemented with its circumferential surface to the inner surface thereof to counteract the beam refraction through the radome wall and to bring the refracted beam back substantially into the direction between the antenna and the actual position of a target. The plug material is such that it will not appreciably reduce the transmission of radar energy through the radome. In order to obtain a flat and smooth boresight error curve covering look angles from 0° to 35° in opposite directions it is important that the wall should be of substantially uniform thickness in all radar beam directions and the inside and outside surfaces thereof continuously curved without waves. For determining the correct position of the plug in the radome and also its thickness it is necessary to first determine the boresight error curve of the radome and then cut and place therein the plug for best results. This is necessary because each single radome has its own boresight error characteristics. The boresight error curve of the radome can be readily determined and graphically recorded.

For a better understanding of the invention reference should be had to the accompanying drawing, wherein FIG. 1 is a diagrammatical, longitudinal cross-sectional view of one embodiment of the invention.

FIG. 1a is an exaggerated cross-sectional view of the radome wall.

FIG. 2 illustrates a boresight error curve of the radome without a plug as boresight error compensator, whereas FIG. 3 shows a boresight error curve of the same radome provided with a plug as boresight error compensator.

With specific reference to the form of the invention illustrated in the drawing the numeral 1 indicates a radome forming the nose of a missle 2 and being made of resin-impregnated, void-free glass-fiber cloth laminates (shown in exaggerated detail in FIG. 1a) formed as a body of rotation of elliptical shape. In the scanning portion of radome 1 is inserted a plug or disk 3 made of foamed polystyrene having a very low dielectric constant and which is cemented thereto with its circumferential surface in all around contact by a thin film of acryloid B-72, commerically known as Krylon, for the purpose of compensating the refraction of the electromagnetic rays passing through the radome wall. In the center of the radome is placed a radar antenna 4 provided with a reflector 5 fixed to an electric motor 6 rotatable about its stator 7 fastened to a bracket 8 tiltable about a pivot 9 of the outer bracket 10 rotatable about a shaft 11 on part 12 of the missile so that the radar beam, having approximately a 6° angular width, can scan the radome at look angles from 0° to about 35° in all directions.

The elliptical shape of the radome has been chosen to reduce the air resistance of the missile. However, because the electro-magnetic radar rays, when passing through the radome wall, are refracted, the refracted ray after leaving the wall is not parallel with the direction of the ray before being refracted as would be the case if it would pass through a flat wall having parallel surfaces. Therefore, the target is not seen by the antenna in its real position but offset, since the tangents on the radome surface at the point where the ray enters the radome and at the point where the ray leaves the radome are not parallel so that the boresight error becomes too large for proper functioning of the antenna. This disadvantage is obviated completely or at least to a great extent by inserting into the radome the plug or disk 3 made of material having a much lower dielectric constant than the radome wall and which lets the electro-magnetic beam pass with substantially no loss of energy but will refract the rays in such a way that the boresight error due to ray refraction through the radome wall is substantially compensated.

As illustrated in FIG. 1, the ray R emitted from the antenna through the center of the radome will pass therethrough without boresight error and find the target T at its actual position. However, the antenna 4, as shown in dotted lines at a look angle $\varphi$, emitting a ray $R_1$ will only in absence of a radome see the target $T_1$ at its actual position, but passing through the radome at $T_1'$ along the refracted dotted line $R_1'$ will see the target not just parallelly offset but at an angle with the original direction of $R_1$ and away from the radome centerline, because the radome wall is curved, chiefly causing a boresight error which must be corrected to the greatest possible extent in order to make the antenna perform properly. For this purpose the plug 3, having an optical function, is to compensate this boresight error. Experiments have shown that this is possible after having determined the boresight error curve which gives an indication of the necessary plug thickness required and its best location in the radome. Furthermore, by changing the flat rear surface of plug 3 to one which is conical or of other radial contour, the direction of a ray therethrough can be changed so that a boresight error will be reduced to permissible limits. Because the optical sensitivity of this type of radome is very great it is necessary that the surface curvatures and the wall thickness are kept within very narrow tolerances but in spite of which the boresight error curve must be determined for each separate radome and the plug 3 adjusted in accordance to what experience dictates. With a plug thus adjusted and inserted in the radome the ray $R_1$ will be refracted first by plug 3 towards the radome centerline and then refracted away from it by the radome along the line $R_1''$ in such a way that the refraction of $R_1$ by plug 3 compensates the refraction of $R_1$ by the radome so that it will reach the target $T_1$ substantially at its actual position. Of course, since not single rays but electromagnetic beams of considerable angular width are emitted from the antenna, the target, with the boresight error substantially eliminated, will aways be seen in its actual position. The selection of a plug made of styrofoam makes it possible to insert such a plug in a radome without affecting the transmission of radar energy through the radome.

To make the advantage of a boresight error compensator, according to the invention, more obvious, in FIG. 2 is shown a boresight error curve for look angles of 0° to 35° for a radome having no boresight error compensator inserted therein, whereas, FIG. 3 shows a boresight error curve for the same radome provided with a boresight error compensator, whereby a reduction of a boresight error rate from 0.13 degree/degree to an acceptable figure of 0.05 degree/degree has been achieved.

From the aforesaid it will be recognized that the difficulty of producing a radar antenna radome without boresight error or with a negligible error has been overcome by means of a disk of a very low dielectric constant which, after the boresight error curve of the radome has been determined, can be prepared and inserted into the radome in a simple practical way to accomplish the desired end without reworking the radome itself after it has been machined. Although the invention has been described for a radome of elliptical shape, it is also applicable for other shapes and material.

While certain representative embodiments and details have been shown for the purpose of illustrating the invention, it will be apparent to those skilled in this art that various changes and modifications may be made therein without departing from the spirit or scope of the invention.

What is claimed:

1. For a guided missile a radar antenna radome forming a body of rotation of elliptical shape and being made of plies of resin-impregnated glass fiber cloth, a rotatable and tiltable antenna located in said radome, and a plug made of material having a low dielectric constant inserted in and in circumferential contact with the front portion of the radome and being in the path of the electro-magnetic rays emitted from the antenna to compensate the refraction of said rays when passing through the wall of the radome to locate a target in its actual position.

2. For a guided missile a radar antenna radome forming a body of rotation being made of plies of resin-impregnated glass fiber cloth, a rotatable and tiltable antenna located in said radome, and a plug made of material having a low dielectric constant inserted in and in circumferential contact with the front portion of the radome and being in the path of the electro-magnetic rays emitted from the antenna to compensate the refraction of said rays when passing through the wall of the radome to locate a target in its actual position.

3. For a guided missile a radar antenna radome forming a streamlined body of rotation being made of plies of resin-impregnated glass fiber cloth, a rotatable and tiltable antenna located in said radome, and a plug made of foamed polystyrene inserted in and in circumferential adhesive contact with the front portion of the radome and being in the path of the electro-magnetic rays emitted from the antenna to compensate the refraction of said rays when passing through the wall of the radome to locate a target in its actual position.

4. For a guided missile a radar antenna radome forming a body of rotation being made of plies of resin-impregnated glass fiber cloth, a rotatable and tiltable antenna located in said radome, and a plug made of material having a much lower dielectric constant than that of the radome being inserted in and in circumferential adhesive contact with the front portion of the radome and being in the path of the electromagnetic rays emitted from the antenna to compensate the refraction of said rays when passing through the wall of the radome to locate a target in its actual position.

5. For a guided missile a radar antenna radome forming a streamlined body of rotation being made of plies of resin-impregnated glass fiber cloth and having a substantially uniform wall thickness in the direction and in that portion of the wall through which pass the electro-magnetic rays emitted from the radar antenna, a rotatable and tiltable radar antenna located in said radome, and a plug made of material having a low dielectric constant closely to that of air inserted in and in circumferential adhesive contact with the front portion of the radome and being in the path of the electro-magnetic rays emitted from the antenna to compensate the refraction of said rays when passing through the wall of the radome to locate a target in its actual position.

6. For a guided missile a radar antenna radome forming a body of rotation and being made of plies of resin-impregnated glass fiber cloth refracting electro-magnetic rays emitted from a radar antenna placed therein in passing through the radome wall, and a disk, having a low dielectric constant, being inserted into and in circumferential adhesive contact with the radome substantially compensating the refraction of said rays passing through the radome wall to locate a target in its actual position.

7. In combination, a hollow streamlined radome capable of passing electromagnetic waves, a radar antenna in the radome for emitting or receiving electromagnetic waves, and means carried by the inside of the radome to compensate for the refraction of the waves in passing through the radome so as to locate a scatterer in its actual position.

References Cited in the file of this patent
UNITED STATES PATENTS

| | | |
|---|---|---|
| 2,422,579 | McClellan | June 17, 1947 |
| 2,509,903 | Brode et al. | May 30, 1950 |
| 2,541,030 | Busignies | Feb. 13, 1951 |
| 2,554,119 | Perham | May 22, 1951 |
| 2,607,009 | Offel | Aug. 12, 1952 |
| 2,609,505 | Pippard | Sept. 2, 1952 |
| 2,659,884 | McMillan et al. | Nov. 17, 1953 |
| 2,854,668 | McMillan et al. | Sept. 20, 1958 |